United States Patent
Bowers

(10) Patent No.: US 8,322,736 B2
(45) Date of Patent: Dec. 4, 2012

(54) SWING ARM ASSEMBLY

(75) Inventor: Lee N. Bowers, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 13/030,441

(22) Filed: Feb. 18, 2011

(65) Prior Publication Data

US 2012/0211960 A1 Aug. 23, 2012

(51) Int. Cl.
*B60G 9/02* (2006.01)
*B60K 17/00* (2006.01)

(52) U.S. Cl. ... 280/124.116; 280/124.128; 280/124.153; 280/124.156; 180/348; 180/358; 180/378

(58) Field of Classification Search ............ 280/124.116, 280/124.128, 124.153, 124.156–157; 180/210, 180/215–217, 348–349, 353, 358, 377–378
See application file for complete search history.

(56) References Cited

U.S. PATENT DOCUMENTS

| | | | | |
|---|---|---|---|---|
| 4,486,030 | A | * | 12/1984 | Takata et al. ............ 280/124.107 |
| 4,690,426 | A | * | 9/1987 | Kubo et al. ............. 280/124.131 |
| 5,150,918 | A | * | 9/1992 | Heitzmann ................. 280/86.5 |
| 6,047,978 | A | | 4/2000 | Watanabe et al. |
| 6,123,349 | A | * | 9/2000 | Depue .................... 280/124.106 |
| 6,547,268 | B2 | * | 4/2003 | Yamamoto et al. .... 280/124.133 |
| 6,616,157 | B2 | * | 9/2003 | Christophliemke et al. ...................... 280/124.106 |
| 6,843,492 | B2 | * | 1/2005 | Inoue et al. ............ 280/124.135 |
| 7,178,816 | B2 | * | 2/2007 | Chan et al. ............. 280/124.116 |
| 7,204,498 | B2 | | 4/2007 | Alesso et al. |
| 7,284,765 | B1 | * | 10/2007 | Inoue et al. ............ 280/124.166 |
| 7,520,516 | B2 | | 4/2009 | Murata |
| 7,540,514 | B2 | * | 6/2009 | Westnedge ............. 280/124.116 |
| 7,549,657 | B2 | * | 6/2009 | Jargowsky et al. .... 280/124.128 |
| 7,556,272 | B2 | * | 7/2009 | Marchel ................. 280/124.103 |
| 7,566,063 | B2 | * | 7/2009 | Oki et al. ............... 280/124.106 |
| 7,708,106 | B1 | | 5/2010 | Bergman et al. |
| 7,871,093 | B2 | * | 1/2011 | Ogawa et al. .......... 280/124.166 |
| 7,971,888 | B2 | * | 7/2011 | Kim ....................... 280/124.116 |
| 2006/0163834 | A1 | * | 7/2006 | Brereton et al. ....... 280/124.128 |
| 2008/0150249 | A1 | | 6/2008 | Murata |
| 2009/0072505 | A1 | * | 3/2009 | McGinnis .............. 280/124.116 |
| 2010/0019466 | A1 | * | 1/2010 | Lee ........................ 280/124.116 |

* cited by examiner

*Primary Examiner* — Ruth Ilan
*Assistant Examiner* — Darlene Condra
(74) *Attorney, Agent, or Firm* — Ulmer & Berne LLP

(57) ABSTRACT

A swing arm assembly is configured for pivotal coupling with a frame of a vehicle. The swing arm assembly includes first and second support arms. A first axle support bracket is attached to the first support arm and a second axle support bracket is attached to the second support arm. A first reinforcement member includes upper, lower, forward and rearward edges, and is welded to the first axle support bracket along at least a portion of the upper edge and at least a portion of the lower edge of the first reinforcement member. The rearward edge of the first reinforcement member is devoid of weld material. The first support arm is attached to the first reinforcement member. Vehicles including a swing arm assembly are also provided.

26 Claims, 7 Drawing Sheets

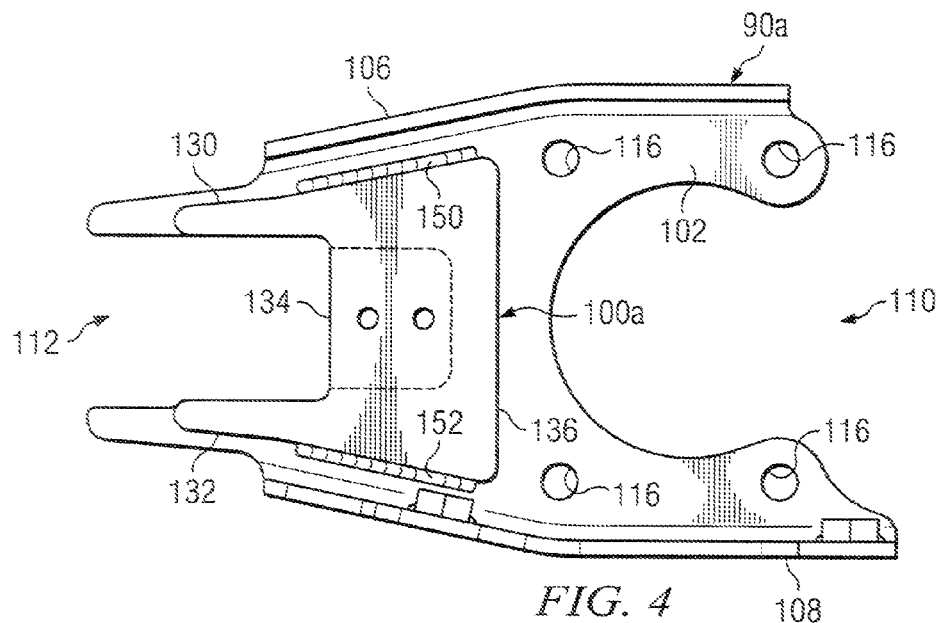
FIG. 4
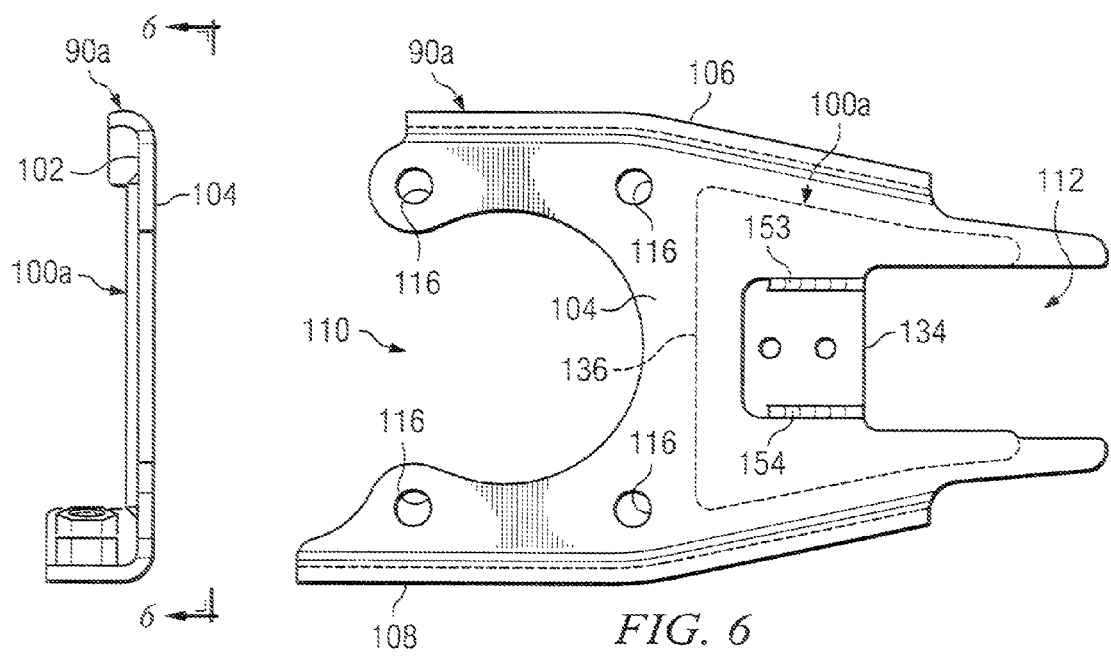
FIG. 5
FIG. 6

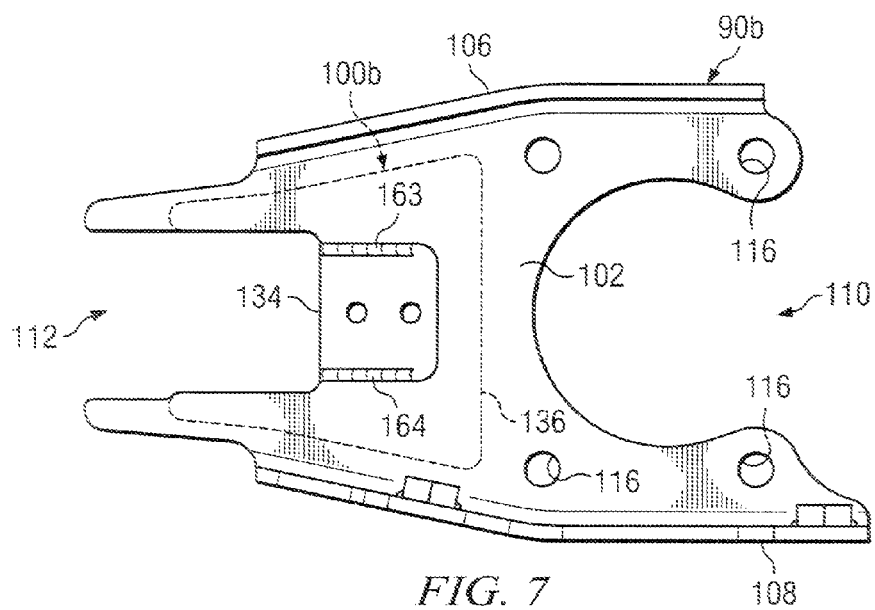
FIG. 7
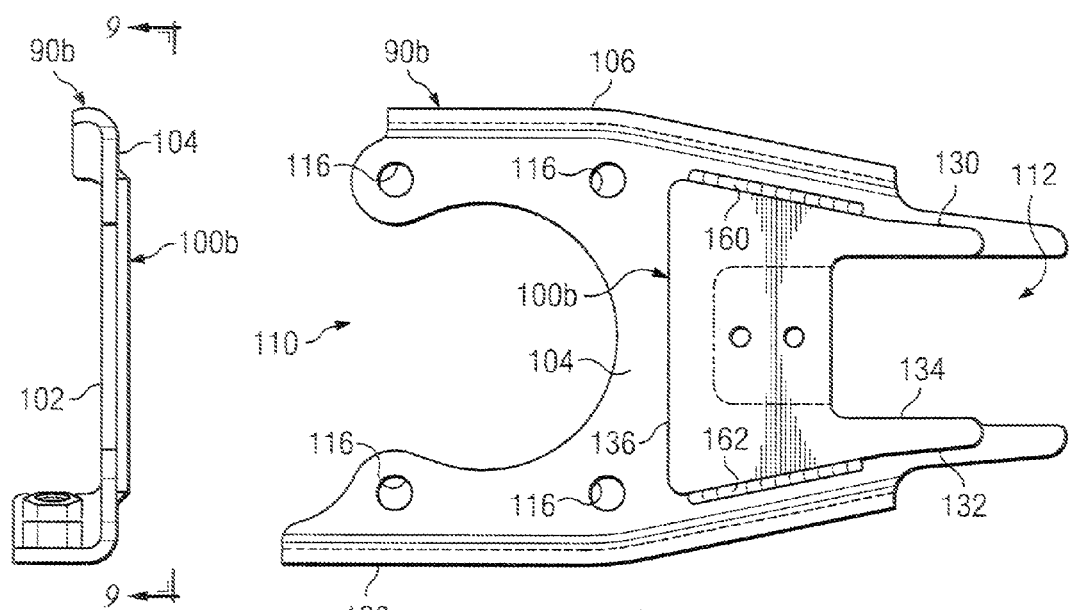
FIG. 8
FIG. 9

SWING ARM ASSEMBLY

TECHNICAL FIELD

A swing arm assembly is configured for pivotal coupling with a frame of a vehicle.

BACKGROUND

Some known all terrain vehicles include a swing arm assembly that is pivotally coupled to a frame of the vehicle. The swing arm assembly includes first and second support arms that are interconnected by a connecting member. A forward end of each of the first and second support arms is pivotally coupled to the frame. The swing arm assembly also includes a first axle support bracket attached to the first support arm and a second axle support bracket attached to the second support arm. Each of the first and second axle support brackets is configured to receive an axle tube.

SUMMARY

In one embodiment, a swing arm assembly is configured for pivotal coupling with a frame of a vehicle and includes a first support arm and a second support arm. The swing arm assembly also includes a first axle support bracket having a first lateral surface and a second lateral surface. The first support arm is attached to one of the first lateral surface and the second lateral surface of the first axle support bracket. The swing arm assembly also includes a second axle support bracket. The second support arm is attached to the second axle support bracket. Each of the first axle support bracket and the second axle support bracket is configured to receive a respective axle tube of a vehicle. The swing arm assembly further includes a first reinforcement member that includes an upper edge, a lower edge, a forward edge, and a rearward edge. The first reinforcement member is welded to one of the first lateral surface and the second lateral surface of the first axle support bracket along at least a portion of the upper edge and at least a portion of the lower edge of the first reinforcement member, the rearward edge of the first reinforcement member being devoid of weld material. The first support arm is attached to the first reinforcement member.

According to another embodiment, a vehicle includes a frame and a swing arm assembly pivotally coupled with the frame. The swing arm assembly includes a first support arm and a second support arm. The swing arm assembly also includes a first axle support bracket having a first lateral surface and a second lateral surface. The first support arm is attached to one of the first lateral surface and the second lateral surface of the first axle support bracket. The swing arm assembly also includes a second axle support bracket attached to the second support arm. The swing arm assembly further includes a first reinforcement member that includes an upper edge, a lower edge, a forward edge, and a rearward edge. The first reinforcement member is welded to the other of the first lateral surface and the second lateral surface of the first axle support bracket along at least a portion of the upper edge and at least a portion of the lower edge of the first reinforcement member, the rearward edge of the first reinforcement member being devoid of weld material. The first support arm is attached to the first reinforcement member.

BRIEF DESCRIPTION OF THE DRAWINGS

Various embodiments will become better understood with regard to the following description, appended claims and accompanying drawings wherein:

FIG. 4 is a side elevation view of one of the pair of axle support brackets and one of the pair of reinforcement members of the swing arm assembly shown in FIGS. 2 and 3;

FIG. 5 is an end view of the axle support bracket and the reinforcement member shown in FIG. 4;

FIG. 6 is a side elevation view taken along line 6-6 in FIG. 5;

FIG. 7 is a side elevation view of the other one of the pair of axle support brackets and the other one of the reinforcement members of the swing arm assembly shown in FIGS. 2 and 3;

FIG. 8 is an end view of the axle support bracket and the reinforcement member shown in FIG. 7; and FIG. 9 is a side elevation view taken along line 9-9 in FIG. 8;

DETAILED DESCRIPTION

Figure 1:
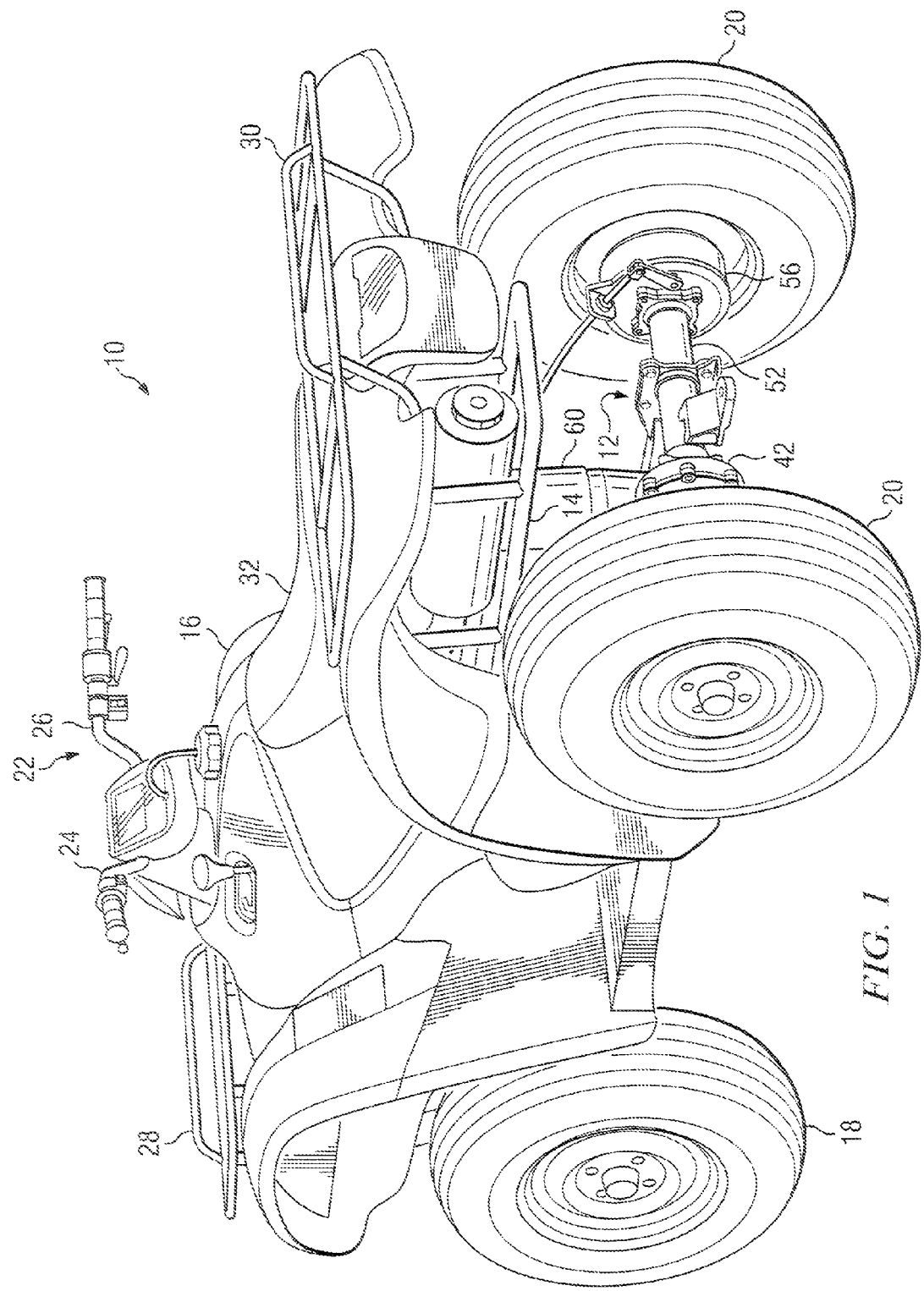
FIG. 1 is a perspective view of a vehicle that includes a swing arm assembly according to one embodiment.

Certain embodiments are herein described in connection with the views and examples of FIGS. 1-11 wherein like numbers indicate the same or corresponding elements throughout the views. FIG. 1 illustrates a vehicle 10 that can include a swing arm assembly 12 in accordance with one embodiment. As illustrated in FIG. 1, the vehicle 10 can be an all terrain vehicle (ATV), but in other embodiments, the vehicle 10 can be another variety of saddle-type vehicle, an automobile, a truck, or any of a variety of other types of vehicles, for example. The vehicle 10 can include a frame 14 that is shown to have a tubular construction. However, the frame 14 can be provided in any of a variety of other suitable arrangements, such as in a unibody construction, for example, and can be formed using any of a variety of materials, such as metal or carbon fiber, for example. The frame 14 can support a body 16 that can include a variety of panels, with one or more of the panels being a decorative panel in some embodiments. The swing arm assembly 12 can be pivotally coupled with the frame 14, as subsequently discussed.

The vehicle 10 can include a pair of front wheels 18 (one shown) and a pair of rear wheels 20. The front wheels 18 can comprise steerable wheels. A handlebar assembly 22 can be operably coupled with the front wheels 18 to facilitate steering of the front wheels 18. The handlebar assembly 22 can include left and right handlebars 24, 26, and can further include a hand grip secured to each of the left and right handlebars 24, 26. The vehicle 10 can also include front and rear cargo racks 28, that can be respectively supported at the front and rear ends of the vehicle 10 by the frame 14 and/or the body 16. Vehicle 10 can also include a seat 32 that can be supported by at least one of the frame 14 and the body 16 of the vehicle 10 and that can be configured to support an operator of the vehicle 10.

Vehicle 10 can include an engine (not shown), which can be an internal combustion engine. Alternatively, vehicle 10 can include one or more electric motors, or other source of motive power. Vehicle 10 can also include a transmission (not shown) that can be coupled with the engine, and a rear drive train that can be coupled with the transmission and each of the rear wheels 20, such that the rear drive train is operable for transmitting torque from the transmission to the rear wheels 20, causing the rear wheels 20 to rotate. The rear drive train can include a drive shaft 40 (FIG. 2), a rear final gear assembly 42, a left rear axle 44 and a right rear axle 46. The drive shaft 40 can be coupled to both the transmission and to the rear final gear assembly 42. Each of the left and right rear axles 44, 46 can be coupled to the rear final gear assembly 42 and to the respective one of the rear wheels 20. The rear final gear assembly 42 can include a housing 48 and a gear assembly (not shown) supported within the housing 48 and coupled to each of the drive shaft 40, the left rear axle 44, and the right rear axle 46. The vehicle 10 can also include left and right rear axle tubes 50, 52, with each of the left and right rear axle tubes 50, 52 being attached at a laterally inner end to the housing 48 of the rear final gear assembly 42.

The left rear axle 44 can be coupled with a left hub 54 and the right rear axle 46 can be coupled with a brake assembly 56. A fastener, e.g., nut 55, can be used to facilitate maintaining a lateral position of the left hub 54 relative to the left rear axle 44, or any other suitable means can be used in this regard in lieu of nut 55. The left and right ones of the rear wheels 20 can be supported by the left hub 54 and the brake assembly 56, respectively. The brake assembly 56 can facilitate selective braking of the vehicle 10. The brake assembly 56 can be manually operated by a user through operation of a handlebar-mounted handle, a brake pedal, or any of a variety of other suitable brake actuation devices. Although the brake assembly 56 is shown to be a drum-type brake arrangement, it will be appreciated that any of a variety of suitable alternative brake arrangements, such as a disk-type brake, can be used. Also, while brake assembly 56 has been shown to be located on the right side of vehicle 10, in association with the right rear wheel 20, a brake assembly can be provided on both sides of vehicle 10, on either side, at a location generally in the center between the sides, or not at all.

Figure 2:
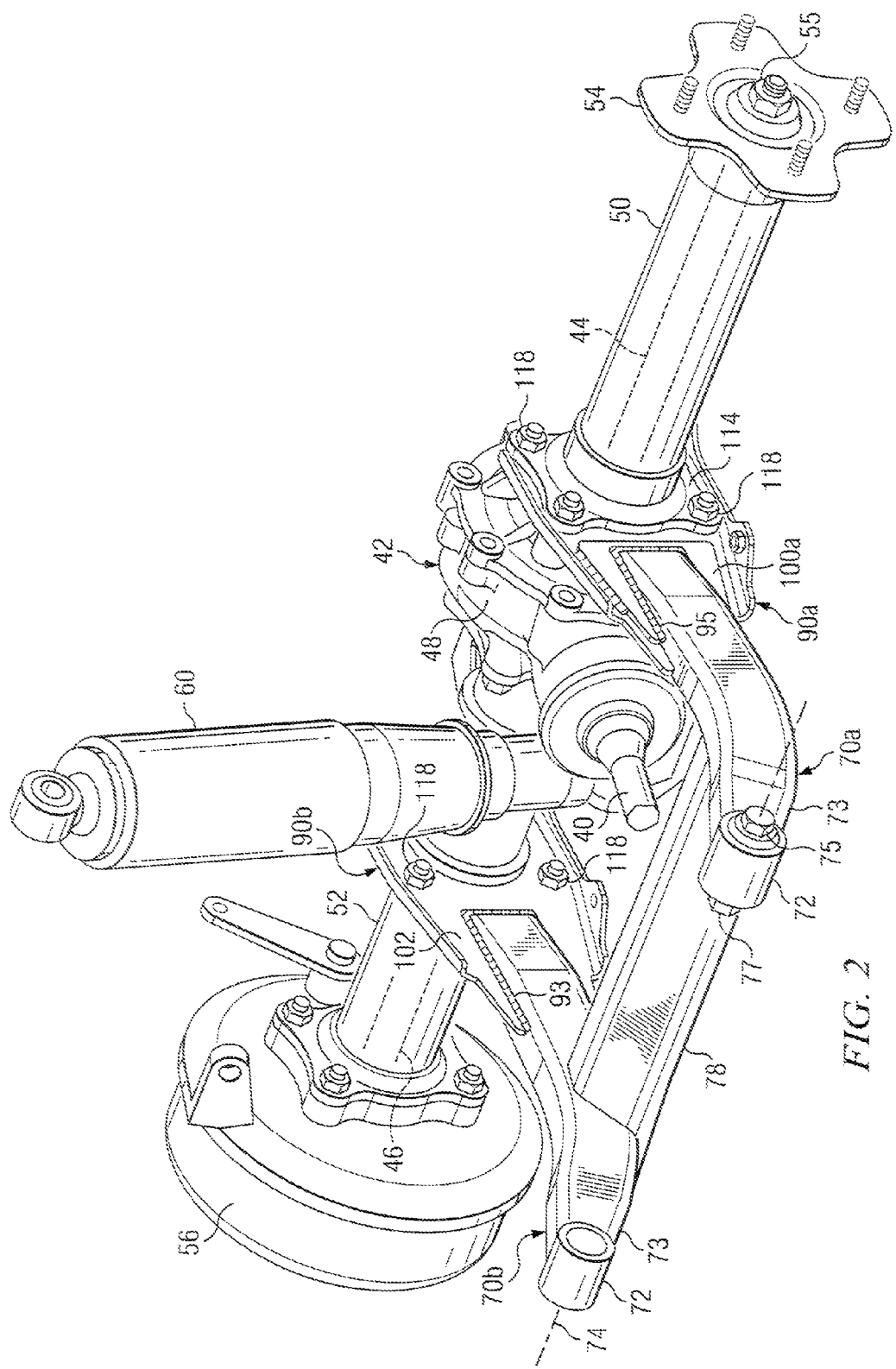
FIG. 2 is a perspective view of the swing arm assembly shown partially in FIG. 1, and other components of the vehicle of FIG. 1.

As shown in FIG. 2, the vehicle 10 can also include a cushion member 60. The cushion member 60 can be configured to dampen shock impulses provided to the swing arm assembly 12, for example when the vehicle 10 traverses uneven terrain. In one embodiment, the cushion member 60 can comprise a hydraulic coil-over-damper type shock absorber, but in other embodiments can comprise any of a variety of suitable alternative dampers, such as an electromagnetic-type damper.

The swing arm assembly 12 can include a pair of support arms 70a and 70b and can also include a pair of coupling members 72. The support arms 70a and 70b can be identical as shown generally in FIG. 3 or alternatively, the support arms 70a and 70b can have different shapes and/or configurations. As shown in FIG. 2, each of the coupling members 72 can be attached to a forward end 73 of one of the support arms 70a and 70b. In one embodiment, each coupling member 72 can be hollow, and can have a cylindrical shape. In such an embodiment, pivots, e.g., a pair of pivots 75 (one shown), which can be bolts, pins, or the like, can be provided through the frame 14 (not shown in FIG. 2) and respective ones of the coupling members 72 to facilitate pivotal coupling of the swing arm assembly 12 with the frame 14 and pivoting thereof about an axis 74 (FIG. 2). The pivots can be retained in any suitable manner. For example, each pivot 75 can be retained by a fastener, e.g., nut 77. It will be appreciated that the swing arm assembly 12 can be pivotally coupled with a frame in any of a variety of suitable alternative arrangements. The swing arm assembly 12 can include a transverse support 78 that can be secured to each of the support arms 70a and 70b.

Figure 3:
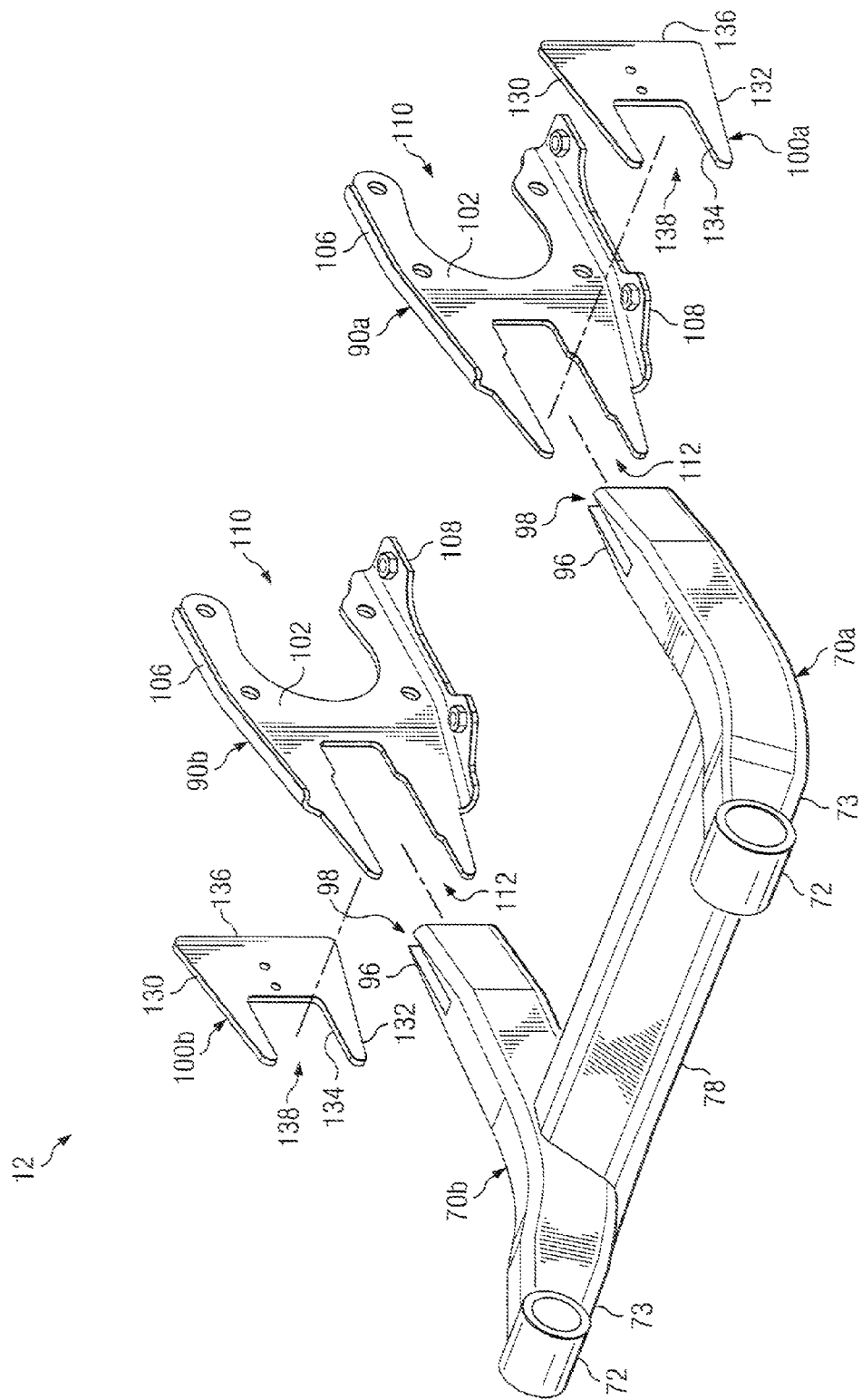
FIG. 3 is an exploded perspective view of the swing arm assembly shown in FIG. 2.

The swing arm assembly 12 can also include a pair of axle support brackets 90a and 90b. The axle support brackets 90a and 90b can be identical as shown in FIGS. 3-9, or alternatively, axle support brackets can be provided that can have different shapes and/or configurations. Each of the axle support brackets 90a and 90b can be attached to a respective one of the support arms 70a and 70b. As shown in FIG. 3, each of the support arms 70a and 70b can include a rearward end 96 that is opposite the forward end 73. As shown in FIGS. 2 and 3, the rearward end 96 of each support arm 70a and 70b can be tapered, which can facilitate effective welding of the axle support brackets 90a and 90b to the respective support arm 70a and 70b.

The swing arm assembly 12 can also include a pair of reinforcement members 100a and 100b, which can be identical as shown in FIGS. 3-9. Alternatively, the reinforcement members 100a and 100b can have different shapes and/or configurations than those shown in FIGS. 3-9. Each of the reinforcement members 100a and 100b can be attached to a respective one of the axle support brackets 90a and 90b. The rearward end 96 of each support arm 70a and 70b can define a slot 98 that can be configured to receive a respective one of the axle support brackets 90a and 90b and a respective one of the reinforcement members 100a and 100b. For example, the slot 98 defined by the rearward end 96 of the support arm 70a can receive the axle support bracket 90a and the reinforcement member 100a attached to the axle support bracket 90a, and the slot 98 defined by the rearward end 96 of the support arm 70b can receive the axle support bracket 90b and the reinforcement member 100b attached to the axle support bracket 90b. In one embodiment, each reinforcement member 100a and 100b can be welded to the respective one of the axle support brackets 90a and 90b, and each of the support arms 70a and 70b can be welded to the respective one of the axle support brackets 90a and 90b and can also be welded to the respective one of the reinforcement members 100a, 100b, as subsequently discussed in further detail.

Referring to FIGS. 3-9, each of the axle support brackets 90a and 90b can include a first lateral surface 102 and a second lateral surface 104. Each of the axle support brackets 90a and 90b can also include an upper flange 106 and a lower flange 108. In one embodiment, each of the flanges 106, 108 can extend away from the first lateral surface 102, as shown in FIG. 3. Each of the axle support brackets 90a and 90b can define a rearward aperture 110 and a forward aperture 112. The rearward aperture 110 can be configured to receive a respective one of the rear axle tubes 50, 52, and the forward aperture 112 can be configured to receive a respective one of the support arms 70a and 70b.

The vehicle 10 can further include a pair axle tube mount flanges 114. One of the axle tube mount flanges 114 can be secured to the left rear axle tube 50, and the other axle tube mount flange 114 can be secured to the right rear axle tube 52. The axle tube mount flanges 114 can be secured to the left and right rear axle tubes 50, 52 by any suitable means, such as by welding. Each of the axle support brackets 90a and 90b can be releasably attached to a respective one of the axle tube mount flanges 114, to facilitate releasable attachment of the swing arm assembly 12 to each of the left and right rear axle tubes 50, 52. For example, each of the axle support brackets 90a and 90b can define a plurality of apertures 116 that can be configured to receive a conventional fastener, such as a bolt or a stud. Each of the bolts or studs can extend through an aperture defined by a respective one of the axle tube mount flanges 114 and a mating one of the apertures 116 defined by the respective one of the axle support brackets 90a and 90b and can be secured by a conventional nut (e.g., 118). The axle tube mount flanges 114 can be sized and configured such that they can be positioned vertically between the upper flange 106 and the lower flange 108 of a respective one of the axle support brackets 90a and 90b, when the swing arm assembly 12 is assembled as generally shown in FIG. 2. As shown in FIG. 2, the axle support bracket 90a can be releasably attached to the rear final gear assembly 42.

As shown in FIG. 3, each of the reinforcement members 100a and 100b can include an upper edge 130, a lower edge 132, a forward edge 134, and a rearward edge 136. The forward edge 134 can define a mount aperture 138, which can be configured to receive a respective one of the support arms 70a and 70b. The mount aperture 138 defined by each of the reinforcement members 100a and 100b and the forward aperture 112 defined by each of the axle support brackets 90a and 90b can be sized such that each forward aperture 112 extends rearwardly of the forward edge 134 of the respective reinforcement member 100a, 100b, which can facilitate welding the reinforcement members 100a and 100b to the respective ones of the axle support brackets 90a and 90b. In the embodiment of FIGS. 1-9, the reinforcement member 100a can be welded to the axle support bracket 90a as shown in FIGS. 4-6, and the reinforcement member 100b can be welded to the axle support bracket 90b as shown in FIGS. 7-9. As shown in FIG. 4, the reinforcement member 100a can be welded to the first lateral surface 102 of the axle support bracket 90a along at least a portion of the upper edge 130 (as shown at 150) and along at least portion of the lower edge 132 (as shown at 152) of reinforcement member 100a. The reinforcement member 100a can also be welded to the axle support bracket 90a adjacent a portion of the forward aperture 112 defined by the axle support bracket 90a, e.g., as shown at 153 and 154. Each of the welds shown at 153, 154 can be spaced apart from the upper edge 130, the lower edge 132, and the rearward edge 136 of reinforcement member 100a. Each of the welds shown at 153, 154 can extend away from the forward edge 134 of reinforcement member 100a as shown in FIG. 6. The rearward edge 136 of reinforcement member 100a can be free of weld material.

As shown in FIG. 9, the reinforcement member 100b can be welded to the second lateral surface 104 of the axle support bracket 90b along at least a portion of the upper edge 130 (as shown at 160) and along at least a portion of the lower edge 132 (as shown at 162) of reinforcement member 100b. The reinforcement member 100b can also be welded to the axle support bracket 90b adjacent to a portion of the forward aperture 112 defined by the axle support bracket 90b, e.g., as shown at 163 and 164. Each of the welds shown at 163, 164 can be spaced apart from the upper edge 130, the lower edge 132, and the rearward edge 136 of reinforcement member 100b. Each of the welds shown at 163, 164 can extend away from the forward edge 134 of reinforcement member 100b, as shown in FIG. 7. The rearward edge 136 of reinforcement member 100b can be free of weld material.

Figure 10:
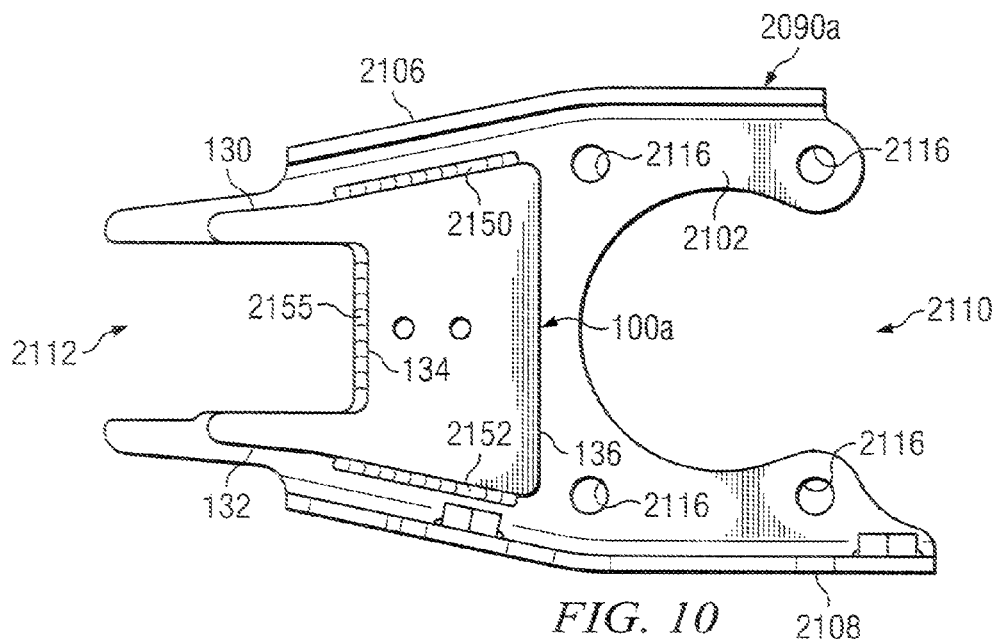
FIG. 10 is a side elevation view of a first one of a pair of axle support brackets according to an alternate embodiment and a first one of the pair of the reinforcement members shown in FIGS. 2 and 3.
Figure 11:
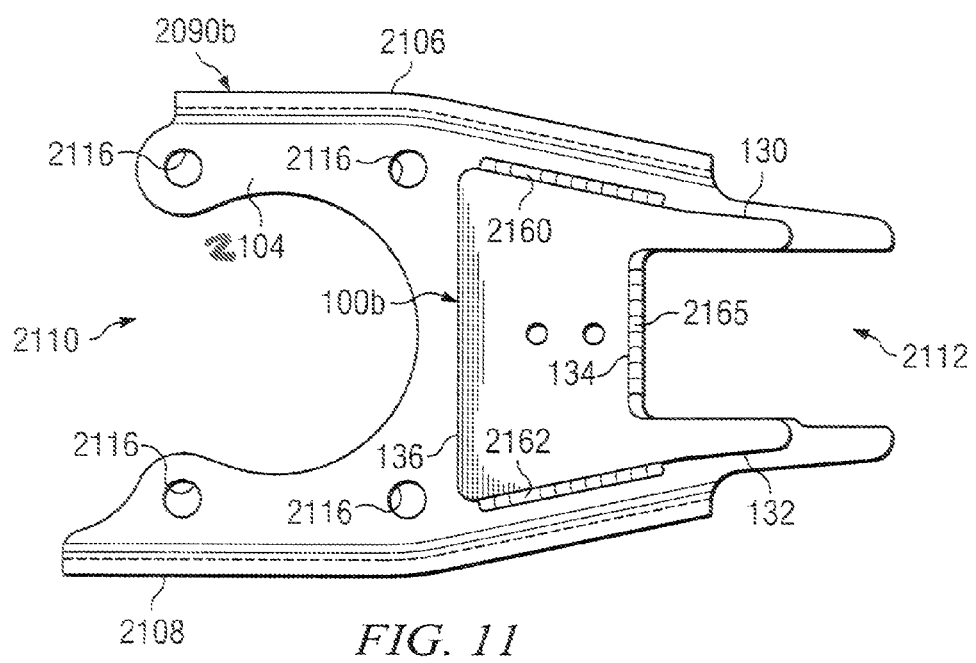
FIG. 11 is a side elevation view of a second one of the pair of axle support brackets according to an alternate embodiment and a second one of pair of the reinforcement members shown in FIGS. 2 and 3.

FIGS. 10 and 11 illustrate a pair of axle support brackets 2090a and 2090b according to an alternate embodiment, which can be used in lieu of the axle support brackets 90a and 90b. For example, the reinforcement member 100a can be welded to the axle support bracket 2090a and the reinforcement member 100b can be welded to the axle support bracket 2090b. Similar to the axle support brackets 90a, 90b, each of the axle support brackets 2090a and 2090b can include a first lateral surface 2102, a second lateral surface 2104, an upper flange 2106, and a lower flange 2108. Each of the axle support brackets 2090a, 2090b can define a rearward aperture 2110 that can be configured to receive a respective one of the rear axle tubes 50, 52, and a forward aperture 2112 that can be configured to receive a respective one of the support arms 70a and 70b. Each of the axle support brackets 2090a and 2090b can also define a plurality of apertures 2116 that can be configured to receive a respective fastener (not shown).

The reinforcement member 100a can be welded to the first lateral surface 2102 of the axle support bracket 2090a along at least a portion of the upper edge 130 (as shown at 2150) and along at least a portion of the lower edge 132 (as shown at 2152) of the reinforcement member 100a, as shown in FIG. 10. The rearward edge 136 of the reinforcement member 100a can be free of weld material. The reinforcement member 100b can be welded to the second lateral surface 2104 of the axle support bracket 2090b along at least a portion of the upper edge 130 (as shown at 2160) and along at least a portion of the lower edge 132 (as shown at 2162) of the reinforcement member 100b as shown in FIG. 11. The rearward edge 136 of reinforcement member 100b can be free of weld material.

The forward apertures 2112 defined by the axle support brackets 2090a, 2090b can be smaller, in a forward to rearward direction, than the forward apertures 112 defined by the axle support brackets 90a, 90b. This can facilitate welding the reinforcement member 100a to the axle support bracket 2090a along the forward edge 134 of reinforcement member 100a at a location adjacent to the aperture 2112 defined by the axle support bracket 2090a. Similarly, the reinforcement member 100b can be welded to the axle support bracket 2090b along the forward edge 134 of reinforcement member 100b at a location adjacent to the aperture 2112 defined by the axle support bracket 2090b.

Figure 12:
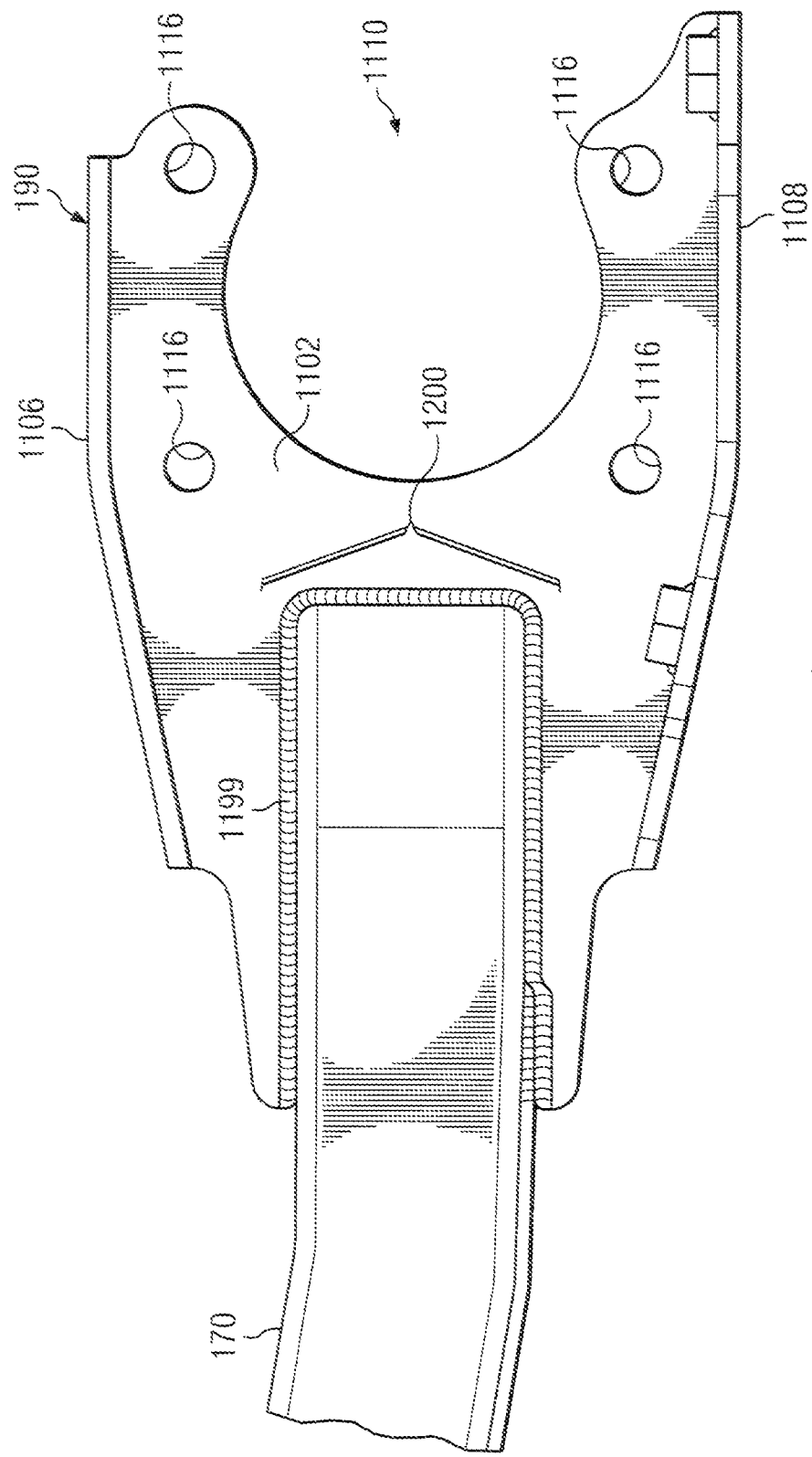
FIG. 12 is a fragmentary, side elevation view of a Prior Art swing arm assembly.

FIG. 12 depicts a portion of a Prior Art swing arm assembly that includes a pair of axle support brackets 190 (one shown), with each of the axle support brackets 190 having upper and lower flanges 1106, 1108, respectively, and a lateral surface 1102. Each axle support bracket 190 defines an aperture 1110 that is configured to receive an axle tube, and each axle support bracket 190 also defines a respective plurality of apertures 1116, with each aperture 1116 being configured to receive a conventional male fastener (not shown). The male fasteners are used to attach each axle support bracket 190 to a respective axle mount flange (not shown). The Prior Art swing arm assembly shown partially in FIG. 12 also includes a pair of support arms 170 (one shown). Each of the support arms 170 is welded to a respective axle support bracket 190 (e.g., as shown at 1199). Unlike the swing arm assembly 12, the Prior Art swing arm assembly shown partially in FIG. 12 does not include any reinforcement members, such as reinforcement members 100, attached to the axle support bracket 190.

The left rear axle 44 and the right rear axle 46 of vehicle 10 are shown to be enclosed by the left rear axle tube 50 and the right rear axle tube 52, respectively. This enclosed configuration of the left and right rear axles 44, 46, provides a relatively stronger unit, i.e. a relatively stronger rear axle assembly, than axle assemblies configured such that the left and right rear axles are not entirely enclosed, since axle tubes such as the left and right rear axle tubes 50, 52 can help support the load on the associated axles, such as the left and right rear axles 44, 46. However, with an enclosed axle configuration, the associated axle tubes can flex somewhat and transmit a twisting load to the associated axle support brackets, such as the axle support brackets 90a and 90b. When such loads are applied to the Prior Art swing arm assembly shown partially in FIG. 12, relatively high stress concentrations can exist at certain locations in each axle support bracket 190, for example at the interface of each support arm 170 and the respective axle support bracket 190, at a location extending around the rearward end of the support arm 170 within, or proximate, the weld 1199, as indicated generally at 1200.

In contrast, the swing arm assembly 12 can exhibit a significant reduction in the maximum stress in the axle support brackets 90a and 90b when such loads are applied, as compared to the maximum stress in the Prior Art axle support brackets 190 (one shown in Prior Art FIG. 12). As discussed previously, each of the reinforcement members 100a and 100b can be welded to the respective axle support bracket 90a and 90b along the upper and lower edges 130, 132 of the respective reinforcement member 100a and 100b. As also discussed previously, the reinforcement members 100a, 100b can also be welded to the respective axle support bracket 90a, 90b adjacent a portion of the forward aperture 112 defined by the respective axle support bracket 90a, 90b. Each of the support arms 70a and 70b can be welded to the respective one of the reinforcement members 100a and 100b and can be welded to the respective one of the axle support brackets 90a, and 90b at a location that can be laterally opposite the location of the respective reinforcement member 100a and 100b. For example, the support arm 70a can be welded to the reinforcement member 100a as indicated generally at 95 in FIG. 2, and can also be welded to the second lateral surface 104 (not shown in FIG. 2) of the axle support bracket 90a, which is opposite the first lateral surface 102 to which the reinforcement member 100a is attached. Similarly, the support arm 70b can be welded to the reinforcement member 100b (not shown in FIG. 2) and can also be welded to the first lateral surface 102 of the axle support bracket 90b, as indicated generally at 93 in FIG. 2, which is opposite the second lateral surface 104 to which the reinforcement member 100b is attached. Due to the presence of the reinforcement members 100a and 100b in the swing arm assembly 12, and the attachment of the reinforcement members 100a and 100b to the respective axle support brackets 90a and 90b along the upper and lower edges 130,132 of each of the reinforcement members 100a and 100b, as well as adjacent to the forward aperture 112 defined by the respective axle support bracket 90a, 90b, with the rearward edge 136 of each of the reinforcement members 100a and 100b being free of weld material, the applied loads can be reacted by both the axle support brackets 90a and 90b and the reinforcement members 100a and 100b, which is different than the load paths in the axle support brackets 190, which can result in a significant reduction in maximum stress in each of the axle support brackets 90a and 90b, as compared to the maximum stresses in the Prior Art axle support brackets 190. This can enhance the service life of the axle support brackets 90a and 90b. Similar advantages can be achieved in embodiments that utilize the axle support brackets 2090a and 2090b in lieu of the axle support brackets 90a and 90b, respectively.

While various embodiments of a swing arm assembly, and a vehicle that includes a swing arm assembly, have been illustrated by the foregoing description and have been described in considerable detail, it is not intended to restrict or in any way limit the scope of the appended claims to such detail. For example, while a swing arm assembly has been shown to include a pair of support arms, a pair of axle support brackets, and a pair of reinforcement members, swing arm assemblies can be provided that include a different number or arrangement of support arms, axle support brackets and reinforcement members. Additional modifications will be readily apparent to those skilled in the art.

What is claimed is:

1. A swing arm assembly configured for pivotal coupling with a frame of a vehicle, the swing arm assembly comprising:
   a first support arm;
   a second support arm;
   a first axle support bracket having a first lateral surface and a second lateral surface, the first support arm being attached to one of the first lateral surface and the second surface of the first axle support bracket;
   a second axle support bracket, the second support arm being attached to the second axle support bracket, each of the first axle support bracket and the second axle support bracket being configured to receive a respective axle tube of a vehicle;
   a first reinforcement member comprising an upper edge, a lower edge, a forward edge and a rearward edge; wherein
   the first reinforcement member is welded to the other of the first lateral surface and the second lateral surface of the first axle support bracket along at least a portion of the upper edge and at least a portion of the lower edge of the first reinforcement member, the rearward edge of the first reinforcement member being devoid of weld material; and
   the first support arm is attached to the first reinforcement member.

2. The swing arm assembly of claim 1, further comprising:
   a second reinforcement member comprising an upper edge, a lower edge, a forward edge and a rearward edge; wherein
   the second axle support bracket comprises a first lateral surface and a second lateral surface;
   the second support arm is attached to one of the first lateral surface and the second lateral surface of the second axle support bracket;
   the second reinforcement member is welded to the other of the first lateral surface and the second lateral surface of the second axle support bracket along at least a portion of the upper edge and at least a portion of the lower edge of the second reinforcement member, the rearward edge of the second reinforcement member being devoid of weld material; and
   the second support arm is attached to the second reinforcement member.

3. The swing arm assembly of claim 2, wherein:
   the first lateral surface of the first axle support bracket is a laterally outer surface and the second lateral surface of the first axle support bracket is a laterally inner surface; and
   the first reinforcement member is welded to the laterally outer surface of the first axle support bracket; and
   the first support arm is welded to the first reinforcement member and is welded to the laterally inner surface of the first axle support bracket.

4. The swing arm assembly of claim 3, wherein:
   the first lateral surface of the second axle support bracket is a laterally inner surface and the second lateral surface of the second axle support bracket is a laterally outer surface;
   the second reinforcement member is welded to the laterally outer surface of the second axle support bracket; and the second support arm is welded to the second reinforcement member and is welded to the laterally inner surface of the second axle support bracket.

5. The swing arm assembly of claim 2, further comprising:
a pair of coupling members; wherein
each of the first and second support arms comprises a forward end and a rearward end;
one of the pair of coupling members is attached to the forward end of the first support arm and the other one of the pair of coupling members is attached to the forward end of the second support arm;
the first axle support bracket is attached to the rearward end of the first support arm; and
the second axle support bracket is attached to the rearward end of the second support arm.

6. The swing arm assembly of claim 5, wherein:
each of the first and second axle support brackets defines a rearward aperture configured to receive a respective axle tube of a vehicle, each of the first and second axle support brackets defining a forward aperture configured to receive a respective one of the first and second support arms;
each of the first and second reinforcement members defines a mount aperture;
the mount aperture of the first reinforcement member is substantially aligned with the forward aperture of the first axle support bracket and receives the first support arm; and
the mount aperture of the second reinforcement member is substantially aligned with the forward aperture of the second axle support bracket and receives the second support arm.

7. The swing arm assembly of claim 5, wherein:
the rearward end of the first support arm is tapered and defines a slot that receives the first axle support bracket and the first reinforcement member.

8. The swing arm assembly of claim 7, wherein:
the rearward end of the second support arm is tapered and defines a slot that receives the second axle support bracket and the second reinforcement member.

9. The swing arm assembly of claim 2, wherein:
each of the first and second axle support brackets comprises an upper flange and a lower flange;
the upper and lower flanges of the first axle support bracket extend away from the first lateral surface of the first axle support bracket; and
the upper and lower flanges of the second axle support bracket extend away from the first lateral surface of the second axle support bracket.

10. The swing arm assembly of claim 2, wherein:
the first axle support bracket defines a forward aperture that is configured to receive a support arm of a swing arm assembly;
the first reinforcement member is also welded to the other of the first lateral surface and the second lateral surface of the first axle support bracket adjacent to a portion of the forward aperture defined by the first axle support bracket.

11. The swing arm assembly of claim 10, wherein:
the second axle support bracket defines a forward aperture that is configured to receive a support arm of a swing arm assembly; and
the second reinforcement member is also welded to the other of the first lateral surface and the second lateral surface of the second axle support bracket adjacent to a portion of the forward aperture defined by the second axle support bracket.

12. The swing arm assembly of claim 2, wherein:
the first reinforcement member is also welded to the other of the first lateral surface and the second lateral surface of the first axle support bracket along the forward edge of the first reinforcement member; and
the second reinforcement member is also welded to the other of the first lateral surface and the second lateral surface of the second axle support bracket along the forward edge of the second reinforcement member.

13. A vehicle comprising:
a frame; and
a swing arm assembly pivotally coupled with the frame, wherein the swing arm assembly comprises:
a first support arm;
a second support arm;
a first axle support bracket having a first lateral surface and a second lateral surface, the first support arm being attached to one of the first lateral surface and the second lateral surface of the first axle support bracket;
a second axle support bracket attached to the second support arm;
a first reinforcement member comprising an upper edge, a lower edge, a forward edge and a rearward edge; wherein
the first reinforcement member is welded to the other of the first lateral surface and the second lateral surface of the first axle support bracket along at least a portion of the upper edge and at least a portion of the lower edge of the first reinforcement member, the rearward edge of the first reinforcement member being devoid of weld material; and
the first support arm is attached to the first reinforcement member.

14. The vehicle of claim 13, wherein:
the swing arm assembly further comprises a second reinforcement member, the second reinforcement member comprising an upper edge, a lower edge, a forward edge and a rearward edge;
the second axle support bracket comprises a first lateral surface and a second lateral surface; and
the second support arm is attached to one of the first lateral surface and the second lateral surface of the second axle support bracket;
the second reinforcement member is welded to the other of the first lateral surface and the second lateral surface of the second axle support bracket along at least of a portion of the upper edge and at least a portion of the lower edge of the second reinforcement member, the rearward edge of the second reinforcement member being, devoid of weld material; and
the second support arm is attached to the second reinforcement member.

15. The vehicle of claim 14, wherein:
the first, lateral surface of the first axle support bracket is a laterally outer surface and the second lateral surface of the first axle support bracket is a laterally inner surface;
the first reinforcement member is welded to the laterally outer surface of the first axle support bracket; and
the first support arm is welded to the first reinforcement member and is welded to the laterally inner surface of the first axle support bracket.

16. The vehicle of claim 15, wherein:
the first lateral surface of the second axle support bracket is a laterally inner surface and the second lateral surface of the second axle support bracket is a laterally outer surface;

the second reinforcement member is welded to the laterally outer surface of the second axle support bracket; and the second support arm is welded to the second reinforcement member and is welded to the laterally inner surface of the second axle support bracket.

17. The vehicle of claim 14, further comprising:

a pair of coupling members; wherein each of the first and second support arms comprises a forward end and a rearward end;

one of the pair of coupling members is attached to the forward end of the first support arm and the other of the pair of coupling members is attached to the forward end of the second support arm;

the first axle support bracket is attached to the rearward end of the first support arm; and the second axle support bracket is attached to the rearward end of the second support arm.

18. The vehicle of claim 17, further comprising:

a left rear axle tube and a right rear axle tube; wherein each of the first and second axle support brackets defines a rearward aperture, the rearward aperture of the first axle support bracket receiving the left rear axle tube, the rearward aperture of the second axle support bracket receiving the right rear axle tube;

each of the first and second axle brackets defines a forward aperture, the forward aperture of the first axle support bracket receiving the first support arm, the forward aperture of the second axle support bracket receiving the second support arm;

each of the first and second reinforcement members defines a mount aperture;

the mount aperture of the first reinforcement member is substantially aligned with the forward aperture of the first axle support bracket and receives the first support arm;

the mount aperture of the second reinforcement member is substantially aligned with the forward aperture of the second axle support bracket and receives the second support arm.

19. The vehicle of claim 18, wherein:

the swing arm assembly further comprises a drive shaft housing; and the drive shaft housing is secured to each of the first support arm, the second support arm, and each one of the pair of coupling members.

20. The vehicle of claim 19, further comprising:

a rear drive train comprising a drive shaft and a rear final gear assembly coupled with the drive shaft, the rear final gear assembly comprising a housing; wherein each of the left rear axle tube and the right rear axle tube is attached to the housing of the rear final gear assembly;

the drive shaft housing is attached to the housing of the rear final gear assembly and is secured to each of the first and second support arms; and the drive shaft is supported within the drive shaft housing and is coupled with the rear final gear assembly.

21. The vehicle of claim 17, wherein:

the rearward end of the first support arm is tapered and defines a slot that receives the first axle support bracket and the first reinforcement member.

22. The vehicle of claim 21, wherein:

the rearward end of the second support arm is tapered and defines a slot that receives the second axle support bracket and the second reinforcement member.

23. The vehicle of claim 14, wherein:

each of the first and second axle support brackets of the swing arm assembly comprises an upper flange and a lower flange;

the upper and lower flanges of the first axle support bracket extend away from the first lateral surface of the first axle support bracket; and the upper and lower flanges of the second axle support bracket extend away from the first lateral surface of the second axle support bracket.

24. The vehicle of claim 14, wherein:

the first axle support bracket defines a forward aperture that receives the first support arm;

the first reinforcement member is also welded to the other of the first lateral surface and the second lateral surface of the first axle support bracket adjacent or portion of the forward aperture defined by the first axle support bracket.

25. The vehicle of claim 24, wherein:

the second axle support bracket defines a forward aperture that receives the second support arm; and the second reinforcement member is also welded to the other of the first lateral surface and the second lateral surface of the second axle support bracket adjacent to a portion of the forward aperture defined by the second axle support bracket.

26. The vehicle of claim 13, wherein:

the first reinforcement member is also welded to the other of the first lateral surface and the second lateral surface of the first axle support bracket along the forward edge of the first reinforcement member; and the second reinforcement member is also welded to the other of the first lateral surface and the second lateral surface of the second axle support bracket along the forward edge of the second reinforcement member.

* * * * *

UNITED STATES PATENT AND TRADEMARK OFFICE
CERTIFICATE OF CORRECTION

PATENT NO. : 8,322,736 B2
APPLICATION NO. : 13/030441
DATED : December 4, 2012
INVENTOR(S) : Lee N. Bowers Page 1 of 1

It is certified that error appears in the above-identified patent and that said Letters Patent is hereby corrected as shown below:

Column 2, line 63, change "28, that" to --28, 30 that--;
Column 7, lines 26-27, change "90a, and" to --90a and--;
Claim 14, column 10, line 49, change "being, devoid" to --being devoid--; and
Claim 15, column 10, line 54, change "first, lateral" to --first lateral--.

Signed and Sealed this
Fifth Day of March, 2013

Teresa Stanek Rea
*Acting Director of the United States Patent and Trademark Office*